United States Patent
Volkov et al.

(10) Patent No.: US 10,664,777 B2
(45) Date of Patent: May 26, 2020

(54) AUTOMATED RECOMMENDATIONS FOR TASK AUTOMATION

(71) Applicant: WorkFusion, Inc., New York, NY (US)

(72) Inventors: Andrii Volkov, Staten Island, NY (US); Maxim Yankelevich, New York, NY (US); Mikhail Abramchik, Minsk (BY)

(73) Assignee: WorkFusion, Inc., New York, NY (US)

( * ) Notice: Subject to any disclaimer, the term of this patent is extended or adjusted under 35 U.S.C. 154(b) by 533 days.

(21) Appl. No.: 14/852,397

(22) Filed: Sep. 11, 2015

(65) Prior Publication Data
US 2017/0076246 A1 Mar. 16, 2017

(51) Int. Cl.
*G06Q 10/00* (2012.01)
*G06Q 10/06* (2012.01)
*G06N 20/00* (2019.01)
*G06N 5/04* (2006.01)

(52) U.S. Cl.
CPC ....... *G06Q 10/063116* (2013.01); *G06N 5/04* (2013.01); *G06N 20/00* (2019.01); *G06Q 10/0633* (2013.01)

(58) Field of Classification Search
CPC ................. G06Q 10/063116; G06Q 10/06
USPC .................................... 705/7.13, 7.16
See application file for complete search history.

(56) References Cited

U.S. PATENT DOCUMENTS

| 7,403,948 B2 * | 7/2008 | Ghoneimy | G06Q 99/00 707/792 |
| 7,562,060 B2 * | 7/2009 | Sindhwani | G06N 3/08 706/25 |
| 7,761,393 B2 * | 7/2010 | Macbeth | G06Q 10/10 706/16 |

(Continued)

FOREIGN PATENT DOCUMENTS

WO WO 2014/084829 A1 6/2014

OTHER PUBLICATIONS

Greg Little, Lydia B. Chilton, Max Goldman, Robert C. Miller (Exploring Iterative and Parallel Human Computation Processes, KDD-HCOP'10, Jul. 25, 2010). (Year: 2010).*

(Continued)

*Primary Examiner* — Hafiz A Kassim
(74) *Attorney, Agent, or Firm* — Baker Botts L.L.P.

(57) ABSTRACT

In one embodiment, a method for providing recommendations for workflow alteration is disclosed. Task results for completion of a first set of iterations of a workflow are received. Training data may be extracted from the task results. The training data may be used to build a machine learning model for altering at least a portion of the workflow. An automation forecast that assesses the effects of altering the workflow for a second set of the iterations of the task may be generated, and a workflow alteration recommendation may be provided. Based on automation parameters, such as a minimum required level of accuracy, and the automation forecast, a recommendation regarding whether (Continued)

to automate the task may be included in the workflow alteration recommendation. Finally, based on the recommendation, an automated process may be generated to handle at least a portion of the task.

18 Claims, 9 Drawing Sheets

(56) References Cited

U.S. PATENT DOCUMENTS

| | | | | |
|---|---|---|---|---|
| 8,020,104 | B2* | 9/2011 | Robarts | G06F 1/163 715/744 |
| 8,355,930 | B2* | 1/2013 | Tholl | G06Q 40/08 705/4 |
| 8,498,892 | B1* | 7/2013 | Cohen | G06Q 10/06 705/7.38 |
| 9,424,074 | B1* | 8/2016 | Pjesivac-Grbovic | G06F 9/48 |
| 10,169,715 | B2* | 1/2019 | Dirac | G06N 20/00 |
| 2005/0125782 | A1* | 6/2005 | Castelli | G06F 11/3636 717/151 |
| 2005/0209902 | A1* | 9/2005 | Iwasaki | G06Q 10/063112 705/7.26 |
| 2005/0256818 | A1* | 11/2005 | Sun | G06Q 10/06316 705/301 |
| 2006/0235691 | A1* | 10/2006 | Tomasic | G06F 3/0481 704/257 |
| 2007/0179829 | A1 | 8/2007 | Laperi | |
| 2007/0282666 | A1* | 12/2007 | Afeyan | G06F 17/50 706/13 |
| 2007/0299795 | A1 | 12/2007 | Macbeth | |
| 2008/0097816 | A1* | 4/2008 | Freire | G06Q 10/063 705/7.26 |
| 2008/0313110 | A1* | 12/2008 | Kreamer | G06Q 10/06 706/12 |
| 2009/0070162 | A1* | 3/2009 | Leonelli | G06Q 10/0633 705/7.27 |
| 2009/0210282 | A1* | 8/2009 | Elenbaas | G06Q 10/06 705/7.13 |
| 2009/0240539 | A1* | 9/2009 | Slawson | G06N 99/005 705/7.29 |
| 2009/0265713 | A1* | 10/2009 | Nedblake | G06Q 10/06312 718/105 |
| 2010/0070422 | A1* | 3/2010 | Kikuchi | G06F 9/5038 705/301 |
| 2011/0313933 | A1* | 12/2011 | Dai | G06Q 10/10 705/301 |
| 2012/0005131 | A1* | 1/2012 | Horvitz | G06N 5/043 706/11 |
| 2012/0029963 | A1* | 2/2012 | Olding | G06Q 10/06 705/7.14 |
| 2012/0072253 | A1* | 3/2012 | Ritter | G06Q 10/06 705/7.13 |
| 2012/0084120 | A1* | 4/2012 | Hirsch | G06Q 30/02 705/7.32 |
| 2012/0116834 | A1* | 5/2012 | Pope | G06Q 10/06316 705/7.26 |
| 2012/0265573 | A1* | 10/2012 | Van Pelt | G06Q 10/06311 705/7.14 |
| 2012/0284090 | A1* | 11/2012 | Marins | G06Q 10/0631 705/7.39 |
| 2013/0191315 | A1 | 7/2013 | Soldacki | |
| 2013/0197954 | A1* | 8/2013 | Yankelevich | G06Q 30/02 705/7.13 |
| 2013/0325763 | A1* | 12/2013 | Cantor | G06Q 10/0633 706/12 |
| 2014/0067804 | A1 | 3/2014 | Yoshizawa | |
| 2014/0108103 | A1* | 4/2014 | Romaine | G06Q 10/06395 705/7.41 |
| 2014/0222485 | A1* | 8/2014 | Cantor | G06Q 10/0633 705/7.22 |
| 2014/0279780 | A1* | 9/2014 | Dasgupta | G06N 5/02 706/46 |
| 2014/0310285 | A1* | 10/2014 | Chan | G06F 17/30598 707/740 |
| 2015/0278241 | A1* | 10/2015 | Bates-Haus | G06F 16/215 707/692 |
| 2015/0317582 | A1* | 11/2015 | Nath | G06Q 10/06 705/7.13 |
| 2015/0317589 | A1* | 11/2015 | Anderson | G06Q 10/08 705/7.25 |
| 2016/0078361 | A1* | 3/2016 | Brueckner | H04L 67/10 706/12 |
| 2016/0162837 | A1* | 6/2016 | Muntes Mulero | G06Q 10/103 705/301 |
| 2017/0046431 | A1* | 2/2017 | Zitouni | G06F 16/168 |

OTHER PUBLICATIONS

Jeffrey M. Rzeszotarski, Aniket Kittur (Instrumenting the Crowd: Using Implicit Behavioral Measures to Predict Task Performance, UIST'11, Oct. 16-19, 2011). (Year: 2011).*
Anand Kulkarni, Matthew Can, Björn Hartmann (Turkomatic: Automatic, Recursive Task and Workflow Design for Mechanical Turk, Association for the Advancement of Artificial Intelligence, 2011). (Year: 2011).*
Jenny J. Chen, Natala J. Menezes, and Adam D. Bradley (Opportunities for Crowdsourcing Research on Amazon Mechanical Turk, Amazon.com, Inc., 2011).*
Ece Kamar, Severin Hacker, and Eric Horvitz (Combining Human and Machine Intelligence in Large-scale Crowdsourcing, Proceedings of the 11th International Conference on Autonomous Agents and Multiagent Systems (AAMAS 2012), Jun. 4-8, 2012, Valencia, Spain). (Year: 2012).*
Yingbo Liu, Jianmin Wang, Yun Yang, and Jiaguang Sun (A semi-automatic approach for workflow staff assignment, ScienceDirect, Computers in Industry 59 (2008) 463-476). (Year: 2008).*
Jia Zhang, Wei Tan, John Alexander, Ian Foster, Ravi Madduri (Recommend-As-You-Go: A Novel Approach Supporting Services-Oriented Scientific Workflow Reuse, 2011 IEEE International Conference on Services Computing). (Year: 2011).*
Anand Kulkarni, Matthew Can, Björn Hartmann (Collaboratively Crowdsourcing Workflows with Turkomatic, CSCW'12, Feb. 11-15, 2012, Seattle, Washington, USA). (Year: 2012).*
Christopher H. Lin Mausam Daniel S. Weld (Dynamically Switching between Synergistic Workflows for Crowdsourcing, 2012, Association for the Advancement of Artificial Intelligence (www.aaai.org). (Year: 2012).*
Yucheng Low, et al. (Distributed GraphLab: A Framework for Machine Learning and Data Mining in the Cloud); Aug. 27-31, 2012; 12 pages; 2012 VLDB Endowment, vol. 5, No. 8; Istanbul, Turkey) discloses an exponential growth in the scale of Machine Learning and Data Mining (MLDM) (Year: 2012).*
W.M.P. van der Aalst, et al. (The Application of Petri Nets to Workflow Management; Department of Mathematics and Computing Science, Eindhoven University of Technology, 1998) discloses Workflow management promises a new solution to an age-old problem: controlling, monitoring, (Year: 1998).*
International Search Report and Written Opinion for International Application PCT/US2016/051226, dated Dec. 28, 2016.

* cited by examiner

FIG. 3

| ID | TITLE | KEYWORDS | TYPE | REWARD | # OF ASSIGNMENTS | SCHEDULE | WORKER SPECS | WORKER QUALITY | RULES | |
|---|---|---|---|---|---|---|---|---|---|---|
| 302 | 306 | 310 | 314 | 318 | 322 | 326 | 330 | 334 | 338 | |
| TASK_1 304 | TITLE_A 308 | TAG_BLOG 312 | CATEGORIZATION 316 | $0.02 320 | $0.02 324 | N/A | N/A | HIGH 336 | RULE_1 340 | ... |
| TASK_2 | TITLE_B | ANALYZE CODE | VALIDATE | $0.05 | $0.05 | 1 WEEK 328 | SOFTWARE 332 | N/A | N/A | ... |
| ... | ... | ... | ... | ... | ... | ... | ... | ... | ... | ... |

300

AUTOMATED RECOMMENDATIONS FOR TASK AUTOMATION

TECHNICAL FIELD

Embodiments of the present invention generally relate to workforce management, and more particularly relate to managing workflows.

BACKGROUND

Workforce management systems may track tasks and projects performed by human and/or virtual workers in order to streamline workflow coordination. Tasks may be assembled into workflows that define projects. Conventional workforce management systems generally receive large amounts of data regarding all aspects of a project, including results from workers' completion of tasks. Traditionally, this data has been used to identify the complexity of assigned tasks and evaluate the most productive workers for completing those tasks. However, business users may wish to use this data in additional ways to improve business goals by altering workflows to increase efficiency and accuracy and to reduce costs.

SUMMARY OF PARTICULAR EMBODIMENTS

In one embodiment, a method for providing recommendations for workflow alteration is disclosed. A first set of iterations of a workflow comprising one or more tasks may be performed, and upon completion, task results may be received. Training data may be extracted from the task results. The training data may be used to build a machine learning model for assessing the workflow. Using the model, an automation forecast may be generated based on assessing the effects of altering the workflow. Based on automation parameters, such as a minimum required level of accuracy, and the automation forecast, a recommendation regarding whether to alter the workflow may be generated. Based on the recommendation, possible alterations to the workflow may include: (1) splitting one or more of the tasks in the workflow into one or more sub-tasks, (2) specifying different worker quality requirements for one or more tasks/sub-tasks in the workflow and identifying a new worker to perform them, and/or (3) automating one or more of the tasks/sub-tasks in the workflow. Such alterations may be designed to provide one or more benefits, such as: an increase in efficiency, an increase in a level of quality of the results, or a decrease in a cost associated with the workflow. After altering the workflow in accordance with the recommendation, particular embodiments may test the altered workflow to obtain new task results and then validate the new task results to determine whether the benefits were achieved.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 is a table illustrating one example of task data according to one embodiment of the present invention;

DESCRIPTION OF EXAMPLE EMBODIMENTS

Figure 1:
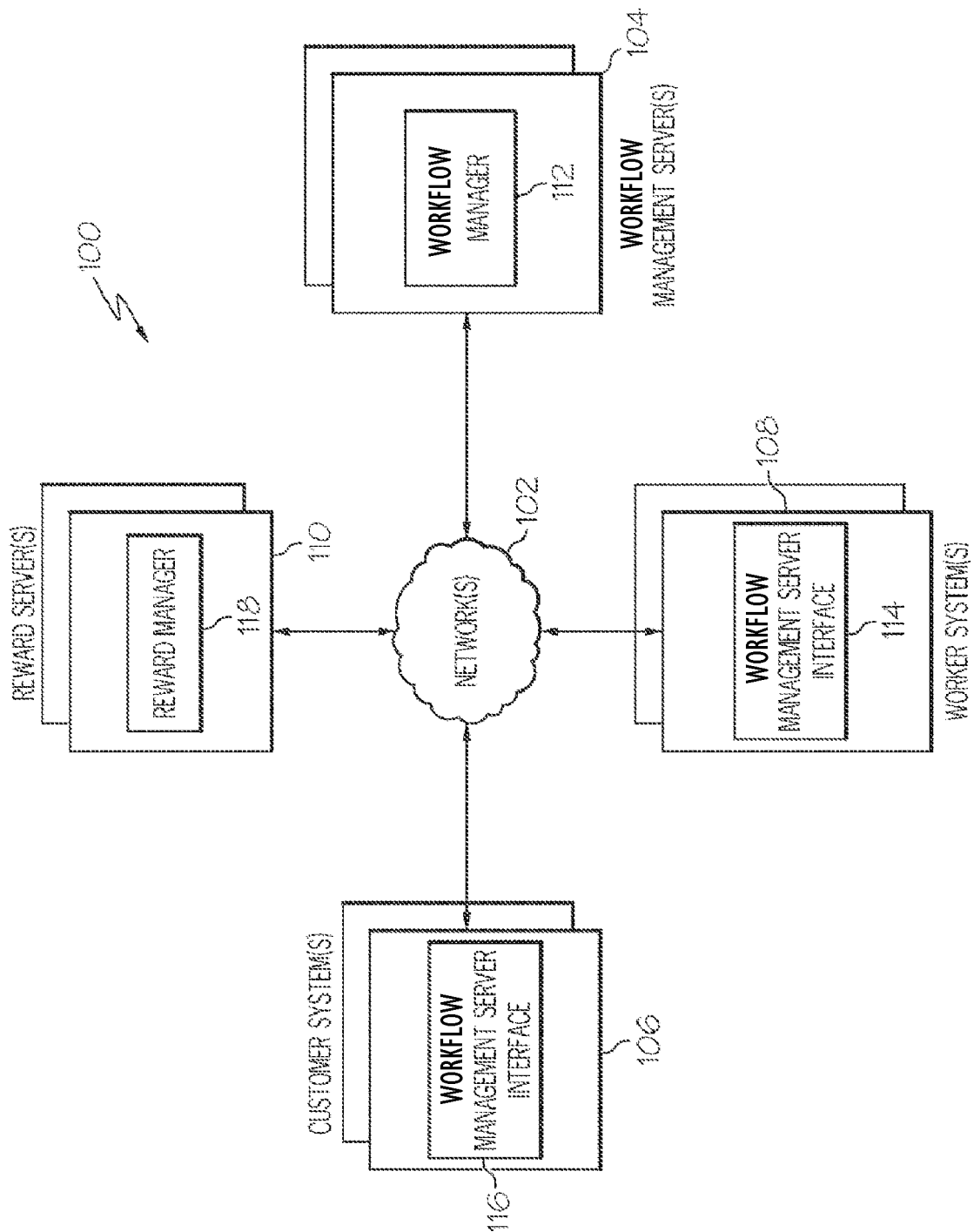
FIG. 1 is a block diagram illustrating one example of a workforce management system according to one embodiment of the present invention.

FIG. 1 shows one example of a workforce management system 100 according to one embodiment of the present invention. The workforce management system 100 comprises one or more networks 102 that, in one embodiment, may include wide area networks, local area networks, wireless networks, and/or the like. It should be noted that the network 102 comprises various networking hardware (and software) components such as gateways, routers, firewalls, etc., which are not shown for simplicity. The environment 100 includes a plurality of information processing systems 104, 106, 108, 110 that are communicatively coupled to the network(s) 102. The information processing systems 104, 106, 108, 110 include one or more workforce management servers 104, one or more customer systems 106, one or more worker systems 108, and one or more reward management servers 110 (or payment systems 110). The environment 100 may also include additional systems such as admin systems, database systems, storage systems, etc., which are not shown in FIG. 1. Users of the worker systems 106 and customer systems interact with the workforce management server 104 via an interface 114, 116 or programmatically via an API(s).

Throughout this discussion a "customer" refers to an entity that submits/creates a task to the workforce management server 104 to be sourced (e.g., published, broadcasted, advertised, etc.) to a set of one or more workers. This set of one or more workers may be referred to as a "crowd". Workers may be comprised of a cohesive or disparate group of individuals. A "task" (also referred to as a "problem") comprises one or more actions to be performed by the workers. The result of the workers performing these requested actions may be referred to as the "output" or "result" of the task, the "work product" of a "worker", or the "solution" to the problem. A "project" refers to a plurality of related tasks.

The workforce management server 104 comprises a workforce manager 112. The customer and worker systems 106, 108 comprise the interfaces 114, 116 discussed above. The reward server 110 comprises a reward manager 118 for managing the awarding of rewards to workers. The workforce manager 112 of the server 104 manages a workforce management environment provided by the server 104 and also any interactions between customers/workers and the workforce management environment. This workforce management environment allows customers to manage tasks and allows workers to participate in tasks.

Figure 2:
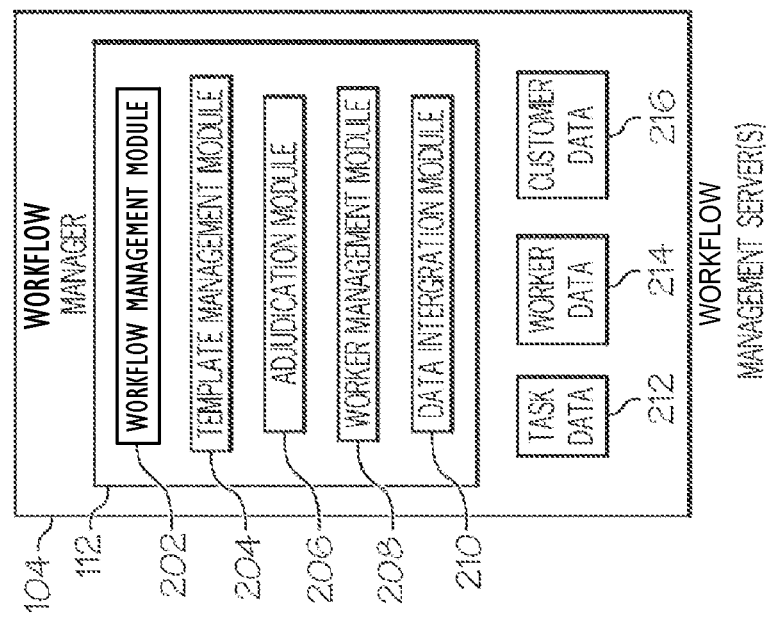
FIG. 2 is a block diagram illustrating a detailed view of a workforce management server according to one embodiment of the present invention.

As shown in in FIG. 2, the workforce manager 112, in one embodiment, comprises a workflow management module 202, a template management module 204, an adjudication module 206, a worker management module 208, and a data integration module 210.

The workflow management module 202 manages tasks and generates tasks for a workflow from information entered by a customer in one or more templates provided by the template management module 204. The workflow management module 202 maintains information associated with tasks as task data 212. This task data 212 may be stored within the workforce management server 104 and/or on one or systems coupled to the server 104. The template management module 204 provides various templates or screens for a customer or worker to interact with when accessing the workforce management server 104. The adjudication module 206 manages the results provided/submitted by a worker for a task. The adjudication module 206 utilizes one or more adjudication rules or acceptance criteria to ensure that the best results of a task are identified and/or to provide a degree of confidence in the correctness of a result.

The worker management module 208 manages the workers associated with the workforce management environment of the workforce management server 104. The worker management module 208 maintains information associated with workers as worker profiles 214. The worker profiles 214 may be stored within the workforce management server 104 and/or on one or more systems coupled to the server 104. The worker management module 208, in one embodiment, uses the worker profiles 214 for, among other things, determining which set of workers to present a given task to. The data integration module 210 interfaces with one or more customer servers (not shown) to provide the data to a worker upon which the task is to be performed. In addition to the above, the workforce management server 104 also comprises and maintains customer data 216. The customer data 216 comprises information associated with each customer that has registered with the workforce management server 104. The workforce manager 112 and its components are discussed in greater detail below.

FIG. 3 shows one example of the task data 212 maintained by the workflow management module 202. It should be noted that although FIG. 3 shows a single table 300 comprising records (i.e., rows) for each task a separate record/file may be stored for each task as well. Also, embodiments of the present invention are not limited to a table and other structures for storing data are applicable as well. Even further, one or more columns may be added and/or removed from the table 300 as well. The table 300 in FIG. 3 comprises a plurality of columns and rows, where each row is associated with a single task. A first column 302, entitled "ID", comprises entries that uniquely identify each task being handled by the workforce management system. For example, a first entry 304 under this column 302 identifies a first task with the unique identifier of "Task_1". The task ID may be automatically assigned by the workflow management module 202 upon creation of a task.

A second column 306, entitled "Title", comprises entries 308 that provide the title of the corresponding task. This title may be manually entered by the customer during the task creation/submission process or automatically generated by the workflow management module 202. It should be noted that the table 300 may also include an additional column (not shown) for providing a more detailed description of the task. A third column 310, entitled "Keywords", comprises entries 312 that comprise optional keywords for the corresponding task. These keywords allow the customer or worker to search for tasks being maintained by the server 104. It should be noted that tasks may be search for by the customer or worker based on any of the information shown (and not shown) in FIG. 3.

Keywords may be manually entered by the customer during the task creation/submission or automatically generated by the workflow management module 202. The workforce manager 112 may use the keywords to determine which tasks to publish/advertise to which workers. For example, a worker may include in his/her profile that he/she only wants to participate in tasks associated with a given type, category, keyword, technical area, etc. The workforce manager 112 may then match tasks to specific workers based on the worker's profile and the keywords associated with the task. In addition, the workforce manager 112 may analyze a worker's previous work history, work performance, qualifications, etc. and determine that the worker excels in a specific task area. The workforce manager 112 may use the keywords associated with a task to ensure that tasks associated with this specific task area(s) are published/advertised to the worker. It should be noted that the workforce manager 112 may utilize any of the information in the task data 212 for determining which workers to select for notification of a given task.

A fourth column 314, entitled "Type", comprises entries 316 that identify a task type for the corresponding task. For example, a first entry 316 under this column 314 indicates that Task_1 is a categorization task. Other non-limiting examples of a task type are rank, validate, or moderate. A task type may be manually assigned to a task by or automatically assigned by the workflow management module 202. A fifth column 318, entitled "Reward", comprises entries 320 that identify the type and/or amount of reward associated with the corresponding task. For example, a first entry 320 under this column 318 indicates that a worker will receive $0.02 for completing the corresponding task (or completing the corresponding task with the correct output, given amount of time, etc.). The reward may be monetary, merchandise, or any other type of reward selected by the customer. A sixth column 322, entitled "# of Assignments", comprises entries 324 that indicate a maximum number of workers that may participate in the task, a minimum number of workers that may participate in the task, a current number of workers currently participating in the task, and/or the like. For example, a first entry 324 under this column 322 indicates that the maximum number of unique workers that may participate in the corresponding task is 3. A seventh column 326, entitled "Schedule", comprises entries 328 that provide optional scheduling information for a corresponding task. Scheduling information may include a task duration (e.g., how long the task is available for), a work duration (e.g., how long a worker has to complete the task), sourcing schedule (e.g., a given date and/or time when the task is to be sourced), and/or the like.

An eighth column 330, entitled "Worker Specs", comprises entries 332 identifying optional workers' qualifications for the corresponding task. These worker specifications/qualifications may be any condition defined by the user that a worker must satisfy prior to being selected for or allowed to participate in a task. These qualifications may be education requirements, age requirements, geographic requirements, previous work history requirements (task or non-task related), previous task work performance, and/or the like. Previous task work performance may include metrics such as an average task completion time, average/number correct results, and/or any other metrics that may be used to represent a worker's work performance. The requirements under this column 330 may be used by the workflow management module 202 to select/filter workers for participation in the corresponding task. A ninth column 334, entitled "Worker Quality", comprises entries 336 identifying optional worker quality requirements for the corresponding task. A worker quality requirement identifies a specific quality rating/metric that must be associated with a worker in order for a worker to be selected for or allowed to participate in a task. This worker quality rating/metric is assigned to a worker by the worker management module 208 based various factors such as previous task work performance, duration of association with the crowd sourcing environment, and/or any other factor/metric that allows the worker management module 208 to assign a weight, rating, or metric that represents the overall quality of a worker.

A tenth column 338, entitled "Rules", comprises entries 340 that include or identify adjudication rules to be applied to the workers' output for a given task. The entries may comprise the actual rules or an identifier/flag that allows the adjudication module 206 to locate the applicable rules (e.g., acceptance criteria) in another table or storage area (not shown). An adjudication rule ensures that the best possible task result(s) is presented to a customer or that a given degree of accuracy and/or confidence may be associated with results provided by workers. For example, an adjudication rule may indicate that additional workers are to be assigned to a task until a given percentage/threshold of workers have provide the (substantially) same task result/solution and use the matching result as the final task result. An adjudication rule provides a way, for example, to determine the correctness of task results/solutions provided by workers.

In certain embodiments, a customer may create a workflow by specifying a data file with certain task parameters. The task parameters may be rules that describe: task results that is to be received from execution of a particular task, an acceptable cost for performance of the task, a required level of accuracy for the task, etc. A task may be created and deployed in a test, or sandbox, environment, and then, once the task results are verified, the task may be deployed to a production environment. Results of the task may be specified in a results data file, which may be used for another task connected to this first task in a workflow.

For example, a financial services customer may create a workflow that involves retrieving financial information from various financial documents generated by large companies. The customer defines the task parameters for completing tasks in the workflow and uploads the data files necessary for completing the tasks. The customer may upload financial reporting documents such as 10-Q's from various companies as the data files for the workflow. The customer may specify that the task parameters include retrieving information about the company's assets as identified in the document. Rules are established that define the desired task results based on a particular format (e.g., by identifying a specified pattern of information appearing in a table including a column for "Assets" and a column for "Liabilities"). Adjudication rules are established for verifying the accuracy of the task results.

In another example, a beverage corporation and distributor may lease branded refrigerated display cases to certain merchants, such as convenience stores, at a reduced rate in order to increase sales of the company's products. The company may set up guidelines or requirements that specify (1) a minimum required percentage of storage space in the display case that must be allocated to beverages provided by the distributor, (2) the position of such beverage products stocked in the display case (should be stocked at customer's eye level) with respect to other beverages that may be stocked in the display case as well, as well as (3) cleanliness and sanitation standards for maintenance of the display cases. These specifications may be based on consumer studies that tend to show that arrangement and maintenance of a display case in a particular manner may increase sales of the company's products. Accordingly, the company may perform quality control checks on the upkeep of these display cases by sending people to stores leasing such branded display cases to perform anonymous random inspections of the display case and take pictures of the display case for later analysis. The beverage company may create a workflow to distribute the pictures for analysis in order to verify that the display cases are being maintained in the manner specified by the company. The task parameters may include identifying areas of the display case that contain products of the particular brands that the company produces. Adjudication rules may be established for verifying the accuracy of the task results before submission to the company or providing the results to a subsequent step in a workflow (e.g., assessing positioning).

A workflow may include tasks performed by human workers, tasks performed by computing devices, tasks outsourced to third parties, automated tasks, and/or other tasks. For example, a human-executed task is a task that is assigned to one or more human workers. Such a task may involve, for example, selecting a particular piece of information from a document via a software interface displayed to the worker, such as a web browser interface. A human task may be performed by a human using a computing device, such as a personal computer or mobile computing device. Tasks performed by computing devices may refer to tasks that may be executed by a computing device without any, or with less, human intervention than a human task.

An automated task is an automated process for a human task that was generated by (1) collecting task results from performance of the human task, (2) extracting training data from the task results, (3) building a machine learning model based on the training data, and then (4) generating an automated process to handle automation for at least a portion of the human task. For example, an automated task may be assigned to a worker application or process running on a server and completed by that process without human intervention. In particular embodiments, the system automating the task may (1) determine an automation forecast to assess effects of automating the task using the machine learning model, (2) produce a recommendation based on the automation forecast and certain automation parameters, and (3) then generate the automated process based on the recommendation and the machine learning model. In particular embodiments, the recommendation may be provided to the customer by way of a user interface in order to enable the customer to decide whether or not to automate the task. In particular embodiments, task results of an automated task may be adjudicated by human workers, such as in a quality control review process. However, in general, automated tasks are primarily performed by software applications or processes.

In certain embodiments, an interface may allow customers or other business users to control the order and flow of such tasks in a workflow by, for example, dragging and dropping various tasks that are connected by rules and conditions in a workflow map. Tasks may be executed successively or in parallel depending on how the workflow is structured. In certain embodiments, a task may take as input (1) data generated by a previously completed task, (2) data provided by an input file, or (3) data retrieved from an outside source or service.

For example, in the financial services scenario described above, the customer may submit a workflow to evaluate a company's share price based on the information described in their quarterly reported data. The workflow may include a number of tasks. For example, assets may be identified in a first task. A different task that may be executed in parallel to this first task includes retrieving liabilities listed in the same document. Yet another task that may be executed in parallel includes retrieving sales data. Those of ordinary skill in the art will appreciate the wide variety of additional tasks that may be defined in such a workflow. After adjudication and validation steps, each of the outputs, or task results, from these tasks may be fed into yet another task for valuing the company based on the company's current balance sheet. Each task or workflow may be performed over many instances. In other words, the business process for the workflow may run iteratively until the data set has been exhausted or completed. In certain embodiments, input data may be streamed so that the input data set may continue to be replenished with new data even as workers complete tasks. For example, the financial services customer described above may execute this workflow for thousands of documents describing financial information for companies, and the workflow management system may continue to process new documents as they are received.

As another example, a workflow for verifying the proper arrangement of beverages in a beverage display case includes a first task of identifying which brand of beverage is in each area of the image of the beverage display case. The results of this task may be fed into another task that includes adjudication or verification of the task results. Once the results are verified, the results are passed to another task that determines whether the arrangement of beverages in the display case conforms to the specifications laid out by the company.

In another example, if a human task involves selecting the number of shares of stock in a particular company that are being transferred in a financial transaction document, a machine task might pre-process the document so that it may be more easily processed by a human (e.g., highlighting certain areas of the document for review by a human worker). The document may be presented to the user in a web application designed to display tasks to human workers and receive user input. In this example, the task is displayed to the user in one panel of the web application, while the financial document is displayed in a different panel. The user may scroll through the financial document and select a block of text displayed in the document panel that corresponds to the task specification. In this case, the selected text corresponds to the number of shares transferred in the financial transaction described by the financial document. The web application copies the specified text to the task panel and displays the text in a task results section of the task panel. The user may be asked to verify the result before it is submitted to a task management module of a workforce management system.

Certain human tasks may be amenable to workflow process optimizations that increase efficiency and/or accuracy and decrease costs associated with completing those human tasks. The teachings of the present disclosure describe systems that enable automation of certain human tasks using training data extracted from the task results from those human tasks. For example, task results and other data regarding completion of tasks may be received after completion and adjudication of the financial transaction task as described above. The task may be identified as one that is a good candidate for automation based on various automation parameters, such as: a required minimum level of accuracy, the current number of valid task results (i.e., the number of iterations of the task that have been performed and verified as accurate), task type, cost, error rate, and/or other attributes of the task. Once a human-performed task is identified as being a good candidate for automation, its task results may be used as training data for building a machine learning module for automating the task.

In certain embodiments, a task creation dashboard is provided from which a new use case may be selected. Use cases may include, for example, data gathering, data entry, e-commerce, sentiment analysis, media tagging, data correction/transformation, transcription and translation, content creation, data collection, data categorization, search relevance/optimization, or other custom use cases. For example, the e-commerce use case may include verification of product categorization, taxonomy research, comparison of e-commerce sites, a ratings page for a quality shopping experience, verification of product attributes, review of technical specifications, or creation of a page title. Those of ordinary skill in the art will appreciate the broad scope of tasks that may be template and created via such an interface contemplated by the present disclosure.

Figure 4:
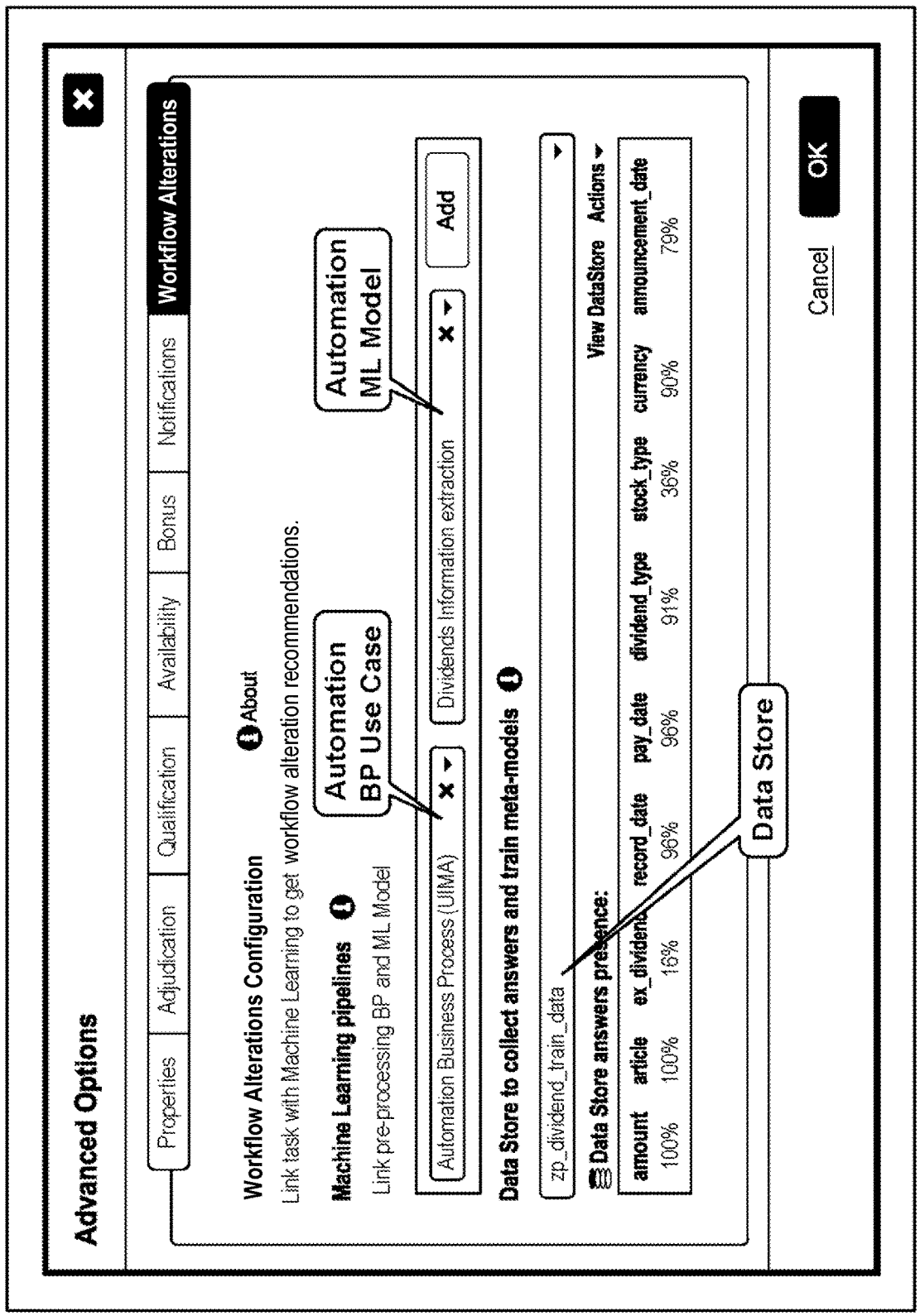
FIG. 4 illustrates one example of an interface to alter a workflow according to one embodiment of the present invention.

FIG. 4 illustrates an example user interface for configuring different options for workflow alterations. In this interface, the "Workflow Alteration" panel 405 of the task creation interface has been selected. Other panels of the workflow creation process may include "Properties," "Adjudication," "Qualification," "Availability," "Bonus," and "Notifications" panels, which may allow the user to specify task parameters and other attributes of the workflow.

Options for configuring different options for workflow alteration may be based on different business process use cases (e.g., automation, task splitting, accuracy enforcement, cost reduction) and associated machine learning models (for different tasks/sub-tasks in the workflow). Input selector 410 displays a selected automation business process use case. The automation business process may be created from the use case identified in input 420 when the task results for a particular task are received. Input selector 420 displays the selected automation machine learning model for the task. For example, available models for selection may include models suited for tasks related to dividends information extraction (as displayed in FIG. 4), classification, and financial reports data extraction. A data store input selector 430 displays a selected data store for retrieving training data for training the machine learning model. For example, the data store may specify any additional training data in addition to results data for the task. In particular embodiments, multiple use cases and associated machine learning models may be selected to configure alterations for a single workflow or a single task.

Configuration of options for workflow alteration may include an automatic evaluation process. Task results, historical task completion data, or other data may be used as training data to train a machine learning model to alter the workflow accordingly. Machine learning model training may begin automatically once a particular amount of training data has been prepared or received. For example, once a certain number of iterations of the stock transaction identification workflow described above have been completed by human workers, the automation module may begin training one or more machine learning models using the task results. Once training is complete, a workflow management interface may display a notification that a recommendation is available for alteration of the workflow.

Figure 5:
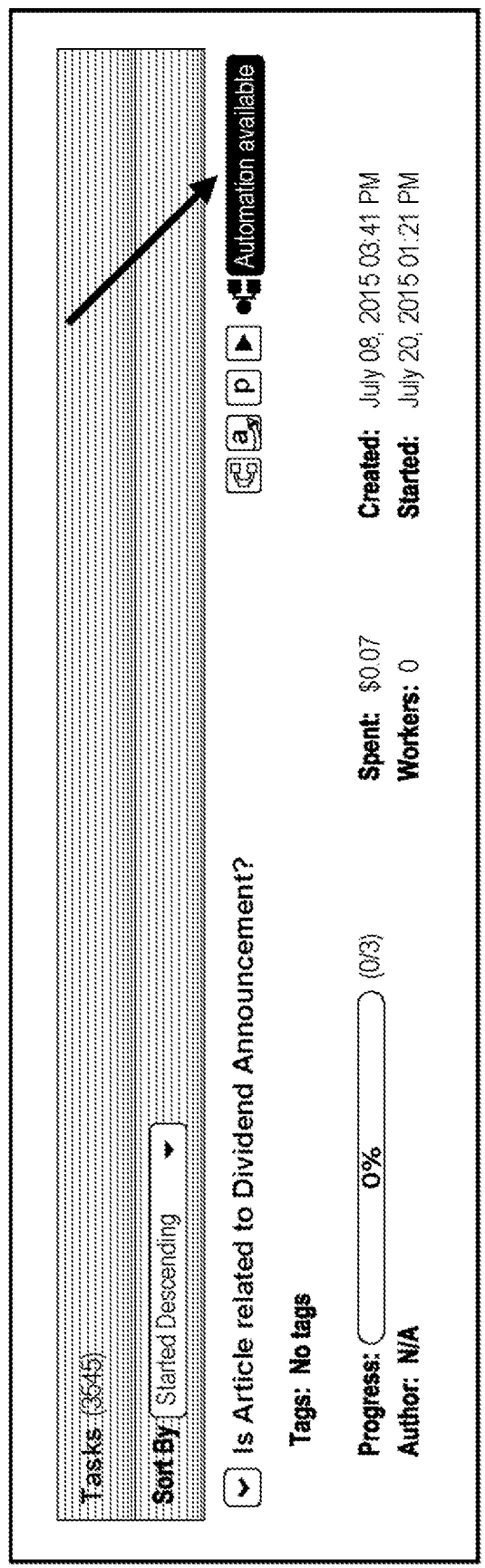
FIG. 5 illustrates one example of an interface for displaying task status and workflow alteration recommendations according to one embodiment of the present invention.

Various models may specify different training data requirements. Accordingly, training each model may begin once the specified number of results have been received, such as by completion of tasks by human workers. For example, several models may be trained for a given task in order to determine which model will produce the best results. Once the minimum threshold amount of training data has been received for each model, training of the model commences and recommendations are provided once training is complete. For example, an "Automation Available" icon, such as that shown in FIG. 5, may be displayed next to a task in a workflow management interface each time a new machine learning model has been trained on the task. The workflow management interface of FIG. 5 may additionally show progress for a particular task. In this example, the task is associated with whether each article in a dataset is related to a dividend announcement for a company. The interface additionally shows the amount of money spent on the task over the life of the project.

For example, as human workers complete the stock transaction task described above, the results may be received at an automation module. The automation module stores task results and converts it to training data. In certain embodiments, the task results may be used as training data without any further processing. Machine learning may occur by deriving rules from task results of completed tasks. For example, as numerous users extract the number of shares of stock that are bought and sold in each document, the machine learning model trains itself to identify this type of data in similar documents. In certain embodiments, this figure may be an abstraction of the actual number within the document as it relates to other contextual markers, or other content, within the document. For example, the number of shares of stock that are transacted may usually be below or above a particular line of text, or may have a certain format, such as a real number. Thus, the model may be trained to automate this particular task by identifying other "marker" content within the financial document to extract the desired content.

In certain embodiments, task results may undergo a features extraction process to program machine learning features in a model in order to become training data. For example, a natural language processor model is programmed to identify particular token words, stopwords, entity tags, word shapes, tokens, and/or dictionary identifications for particular word categories. Particular embodiments may use an aggregate analysis engine to detect entities and annotate training data. Various processes may be run on the training data, such as a language identifier, tokenizer, part of speech annotator, shallow parser, and/or named entity annotator. Accordingly, tokens, parts of speech, names, organizations, places, and persons may be annotated within a training data document.

Other tasks may be well suited for other use cases. For example, the beverage identification task described above would not be a good candidate for a use case involving natural language processing. However, a suitable use case may be selected for automation of such a task, and training data may be created for the corresponding machine learning model in a similar fashion. Those of ordinary skill in the art will appreciate the various machine learning models suitable for application in such a system. For example, standard machine learning models, such as Markov Models, Support Vector Machines, natural-language processing, and the like, may be used to automate tasks using training data supplied by human completion of prior iterations of the task.

Tasks that are suitable for automation may also be suggested to the user in a workflow alteration recommendation. The workflow alteration recommendation may include a forecast of various business metrics that are expected to be affected (and possibly improved) by alteration of the workflow in accordance with the selected use case(s) and machine learning model(s). The forecasted business metrics may include, for example, cost, accuracy, and project completion time. In certain embodiments, the recommendation may also display historical data, such as historical cost and automation data, that shows the impacts of prior alterations on the workflow.

Figure 6:
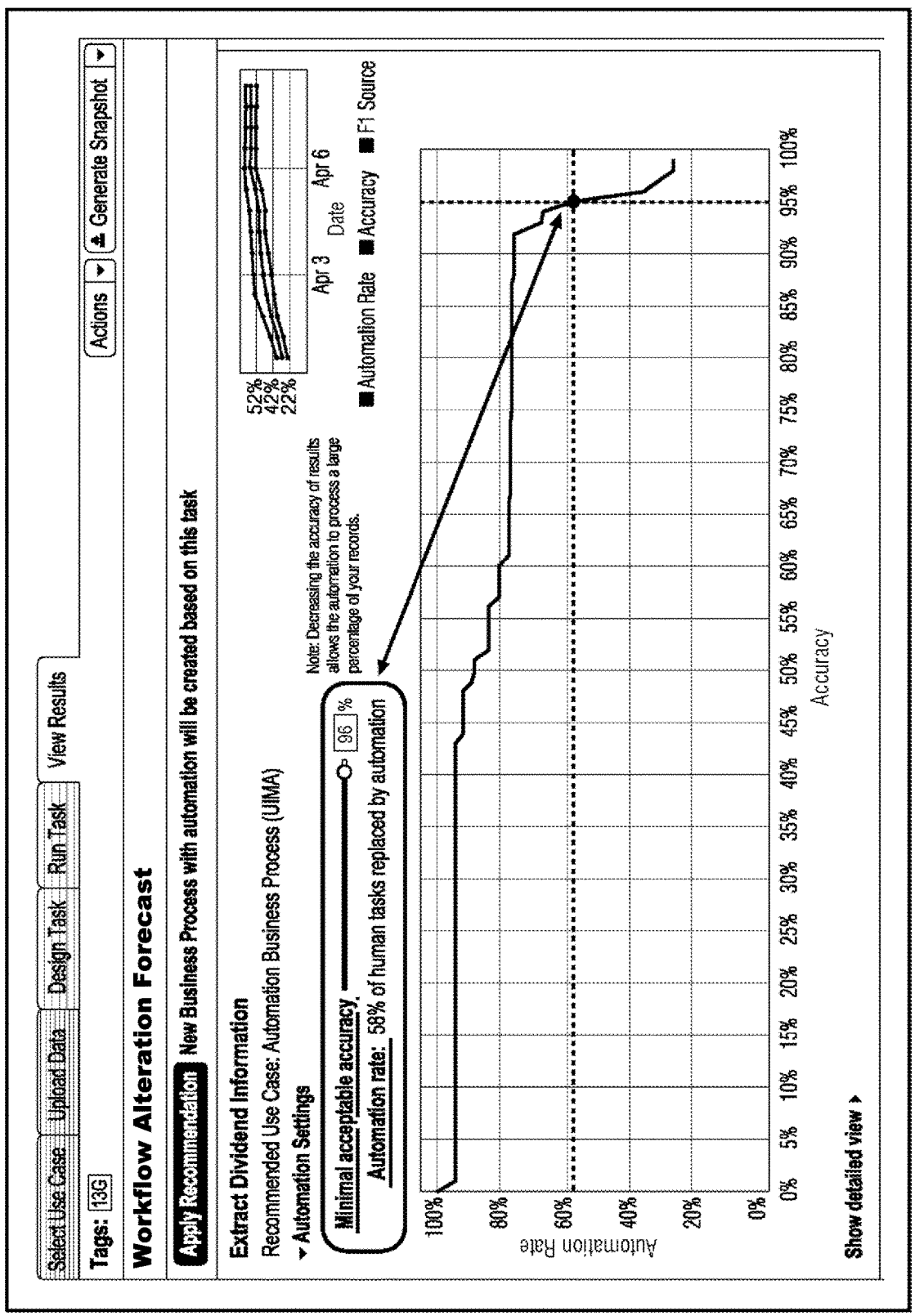
FIG. 6 illustrates one example of an interface for providing workflow alteration recommendations and automation forecasts according to one embodiment of the present invention.

With reference to FIG. 6, a workflow alteration forecast and recommendation is displayed in accordance with one embodiment of the invention. In this particular example, the forecast and recommendation comprises a graph that charts the percentage of all tasks within a particular project that are automated against the anticipated accuracy. A user supplies a minimum acceptable accuracy level, and the graph automatically adjusts to recommend the highest level of automation that may be implemented while still maintaining the input accuracy across the project. In certain embodiments, costs for automation of a particular task may be lower than the costs of hiring a human worker to perform the task. Further, automated tasks may be completed more quickly and reliably than performing the same task with a human worker. Accordingly, the altered workflow may benefit the business in at least reduced cost and increased efficiency. The forecast may indicate a correlation between the degree of automation and the level of accuracy, as well as the point at which a particular degree of automation is able to provide task results conforming to a specified minimal acceptable accuracy level. However, the scenario may be imagined in which the cost of hiring a human worker to perform a particular task is actually less than a machine, such as, for example, due to the increased cost of reviewing the automated work product. In this scenario, a decrease in automation may actually be more beneficial to the business, and the system may provide no automation recommendation for this scenario. Such a scenario may be indicated by an upward sloping or flat accuracy curve with respect to percentage of automation.

In certain embodiments, historical data regarding automation trends, costs, and accuracy may also be displayed. This information may convey the benefits of past workflow automation and continued improvement in machine learning models. Even as automation levels increase, historical accuracy levels may also increase. Thus, increased automation may benefit a customer with respect to cost, accuracy, and project completion time. In certain embodiments, an automation rate may also be displayed. The automation rate may include the percent of records that may be extracted automatically with the given level of minimal acceptable accuracy, and in some instances includes the percent of human tasks that may be or have been replaced by automation.

As discussed above, machine learning models may continue to learn using additional training data received from concurrent completion of human tasks. In certain embodiments, the machine learning models may be calibrated to produce even better accuracy results using this training data. For example, if a human quality review task finds an error in a particular task performed in an automated task, the results of the human reviewed task may be input as training data into the machine learning model. The model may correct itself based on the training data from the user. As another example, certain tasks may be performed both by automation and by human workers. The task results from the human workers may be used as training data for the machine learning model, even while the automation process is active.

The workflow alteration recommendation for suggesting automation or other workflow optimizations will typically only be indicated when some benefit or improvement is determined to be attainable. For example, if a project is 98% complete by the time a sufficient quantity of task results have been collected for processing into training data, the anticipated cost savings expected from this optimization may be negligible due to the relatively short period of time remaining for implementation of any automation. In another example, if the overhead involved in automation outweighs any cost savings gained by automation, or if a sufficient degree of accuracy cannot be obtained when automating the task, it may not be worthwhile to automate the task. Accordingly, optimization of such a task would not be suggested to the business user. In certain embodiments, a series of thresholds may exist for determining whether to generate the automated process, or whether to recommend task automation or another workflow optimization to a user.

Figure 7:
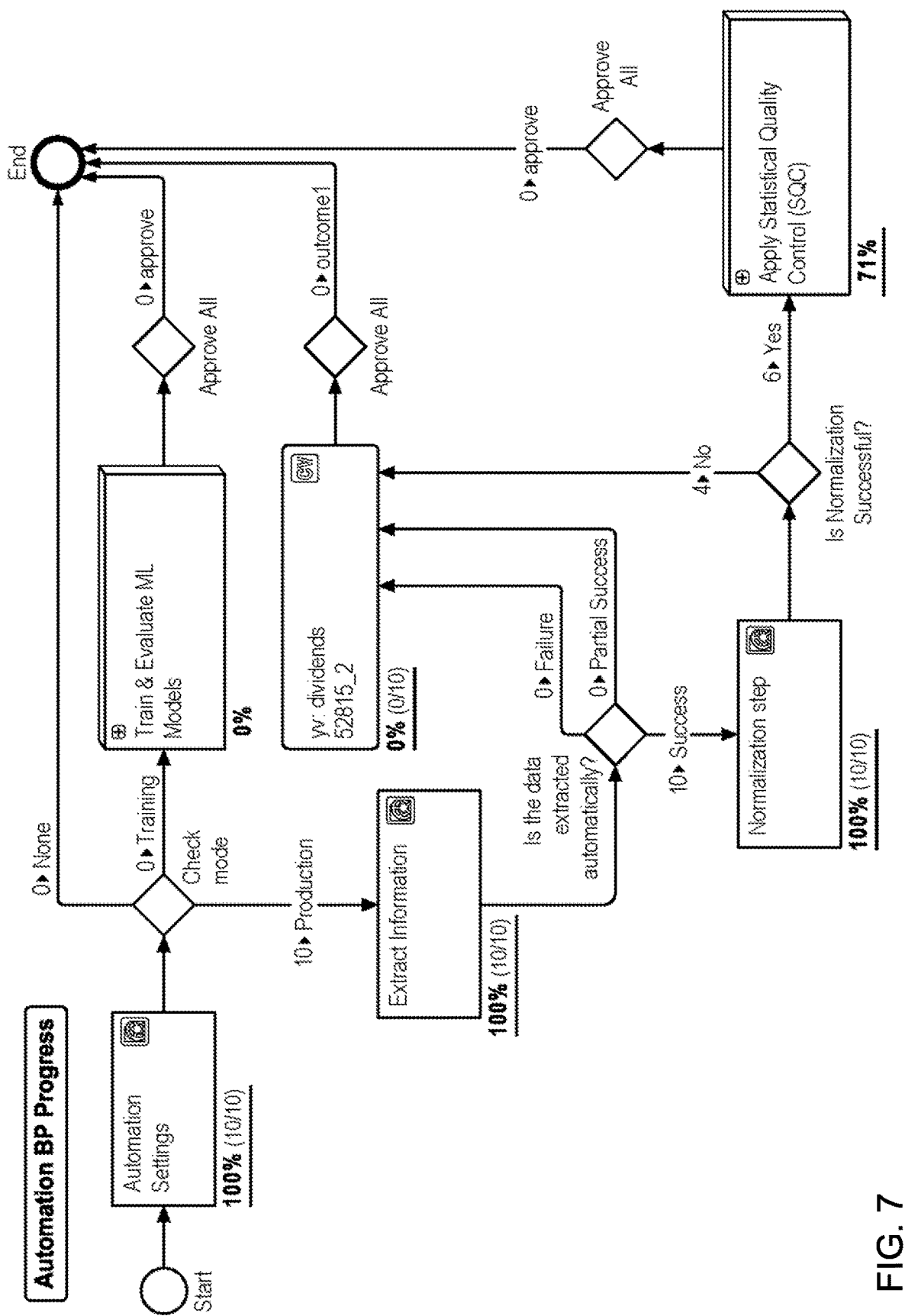
FIG. 7 illustrates one example of a flowchart illustrating a process for altering a workflow by automating a task according to one embodiment of the present invention.

Once an automation level, automation recommendation, or minimal level of accuracy is selected in the task or workflow recommendation interface, such as the interface displayed in FIG. 6, a workflow alteration template may be displayed to start implementation of the automation settings. With reference to FIG. 7, an example automation business process workflow template is illustrated in accordance with an embodiment of the invention. The displayed template may include details of the original workflow, but may have certain human tasks replaced with automated tasks or subtasks. Adjudication and review tasks may be created to validate the accuracy of outputs from any automated tasks.

In certain embodiments, a workflow optimization may include a different configuration of human tasks or automated tasks. For example, when certain beverage distribution company employees perform quality review checks at convenience stores, they may notice the convenience store has several display cases. However, the original workflow may only specify a business process for handling one single display case per store location. In this example, a workflow optimization process may automatically modify the task configuration of the workflow to handle one or more display cases at each location, and provide a compliance rating for the convenience store as a whole based on the maintenance of each display case.

As another example, a workflow optimization may include splitting a particular task up into smaller sub-tasks. For example, a financial document may list several transactions in a single document. However, the original workflow may have been configured to handle only a single transaction per document. The workflow optimization may suggest splitting up this single task into various subtasks. Thus, the workflow may be modified to accommodate unforeseen changes in workflows.

Figure 8:
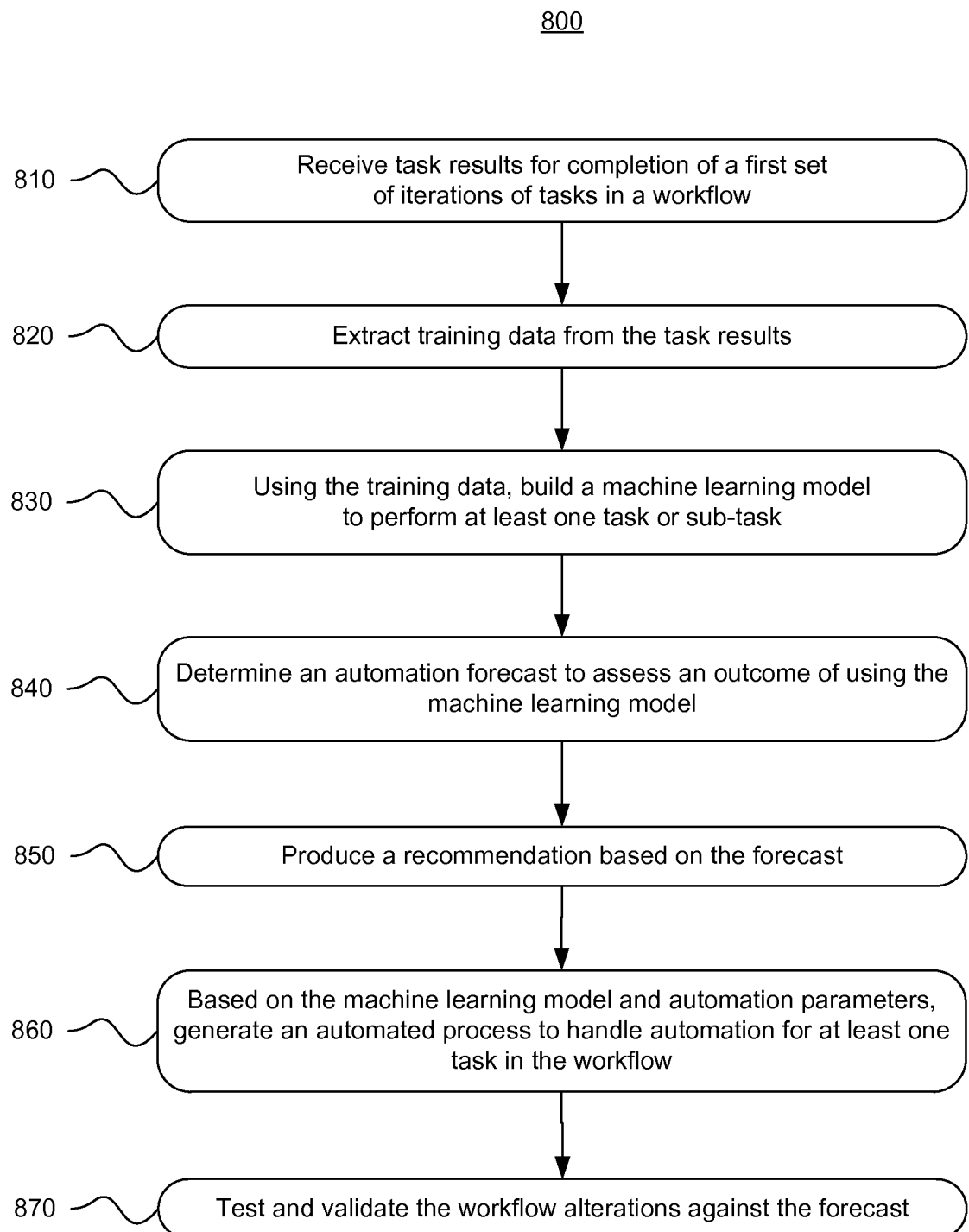
FIG. 8 is a flow diagram illustrating one example of a process for assessing a workflow and providing a recommendation for workflow alteration according to one embodiment of the present invention.

FIG. 8 is a flow diagram illustrating one example of a process for providing workflow recommendations in accordance with an embodiment of the present disclosure. At step 810, task results are received for completion of a first set of iterations of tasks in a workflow. For example, numerous iterations of a human task are assigned to various human workers. As the human workers complete each iteration of the task, a training data database may be created that stores the results of these tasks. After completion of the first set of iterations, the human workers may have additional sets of iterations in their queue for completion. In certain embodiments, the task results are adjudicated with respect to accuracy before being stored as training data. Once a predetermined amount of task results or potential training data is received, training data is extracted from the task results at step 820. Training data is extracted in preparation for building or training a machine learning model for potential automation of the task, or at least automation forecasting. For example, even if an automation task is never implemented, the training data may still be used to train a machine learning model so that any benefits associated with implementation of an automated task may be forecasted and shared with the customer.

At step 830, the training data may be used to build one or more machine learning models to perform at least one task in the workflow. The machine learning model may be based on a particular use case, such as automating the task, splitting the task, re-configuring parameters for the task, etc.

At step 840, a workflow alteration forecast may be determined to assess the outcome of a second set of iterations of the workflow using one or more of the machine learning models. The forecast may include a cost-benefit analysis regarding implementation of different workflow alterations. As discussed above, the feasibility of any workflow alteration strategy may depend on various internal and external project factors, such as the complexity of the task, the minimal required accuracy level, the amount of the project that remains incomplete, and the like.

At step 850, a recommendation is provided based on the forecast. The recommendation may include a particular task in a workflow to automate, split, or otherwise modify. In certain embodiments, the recommendation may include an improvement in an automated or human task.

At step 860, in cases where automation of a task is recommended, an automated process may be generated to handle automation for at least a portion of the task. Parameters may be specified and/or generated for the task to be automated.

At step 870, the workflow alterations may be tested and validated to ascertain whether the projected benefits are being realized.

Figure 9:
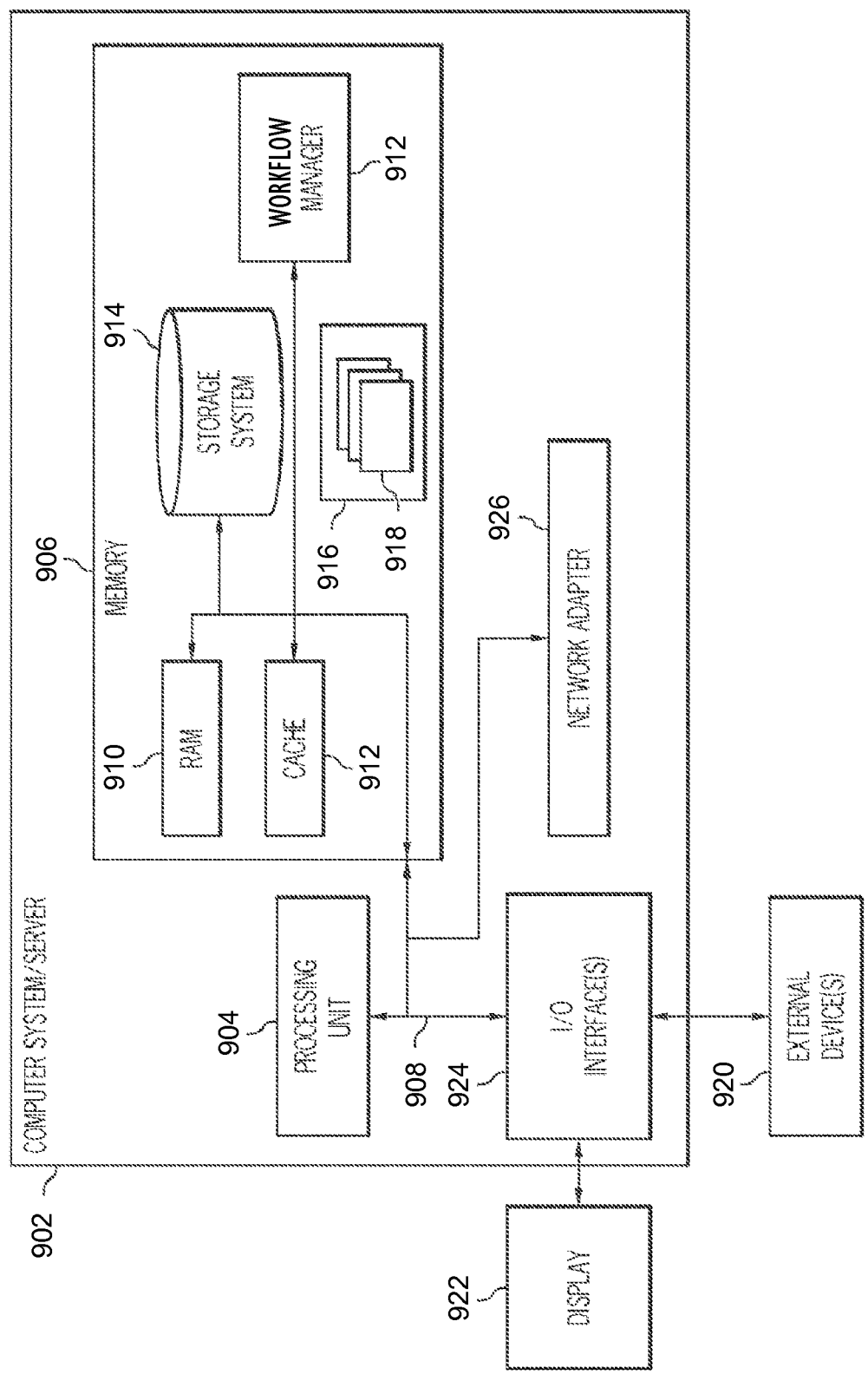
FIG. 9 illustrates one example of an information processing system according to one embodiment of the present invention.

Referring now to FIG. 9, a schematic of an example of an information processing system, such as the server 104 of FIG. 1, is shown. Information processing system 902 is only one example of a suitable system and is not intended to suggest any limitation as to the scope of use or functionality of embodiments of the invention described herein. Regardless, the information processing system 902 is capable of being implemented and/or performing any of the functionality set forth hereinabove.

The information processing system 902 may be a personal computer system, a server computer system, a thin client, a thick client, a hand-held or laptop device, a tablet computing device, a multiprocessor system, a microprocessor-based system, a set top box, a programmable consumer electronic, a network PC, a minicomputer system, a mainframe computer system, a distributed cloud computing system, or the like.

As illustrated in FIG. 10, the information processing system 902 is shown in the form of a general-purpose computing device. The components of the information processing system 902 may include, but are not limited to, one or more processors or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 902 typically includes a variety of computer system readable media. Such media may be any available media that is accessible by the information processing system 902, and it includes both volatile and non-volatile media, removable and non-removable media.

The system memory 906, in one embodiment, comprises the workforce manager 112, its components, and the various data 212, 214, 216 as shown in FIG. 1. These one or more components may also be implemented in hardware as well. The system memory 906 may include computer system readable media in the form of volatile memory, such as random access memory (RAM) 1010 and/or cache memory 912. The information processing system 902 may further include other removable/non-removable, volatile/non-volatile computer system storage media. By way of example only, a storage system 914 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 908 by one or more data media interfaces. As will be further depicted and described below, the memory 906 may include at least one program product having a set (e.g., at least one) of program modules that are configured to carry out the functions of various embodiments of the invention.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the invention as described herein.

The information processing system 902 may also communicate with one or more external devices 920 such as a keyboard, a pointing device, a display 922, etc.; one or more devices that enable a user to interact with the information processing system 902; and/or any devices (e.g., network card, modem, etc.) that enable computer system/server 902 to communicate with one or more other computing devices. Such communication may occur via I/O interfaces 924. Still yet, the information processing system 902 may communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. It should be understood that although not shown, other hardware and/or software components could be used in conjunction with the information processing system 902. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving, by one or more processors of an information processing system, workflow results from completion of a first set of a plurality of iterations of a workflow, each iteration of the workflow comprising one or more tasks performed by one or more distributed computing systems;
   extracting, by the one or more processors and from the workflow results, training data for training a machine learning model to assess the workflow structure, wherein the workflow structure comprises the specification of tasks within each iteration of the workflow, wherein extracting the training data comprises extracting features from workflow results that satisfy an adjudication rule and that are appropriate for use by the machine learning model;
   training, by the one or more processors, the machine learning model for assessing the workflow structure using the features of the training data extracted from the workflow results;
   determining, by the one or more processors using the trained machine learning model for assessing the workflow structure, a forecast of an effect on one or more metrics of altering the workflow structure in accordance with one or more alterations proposed based on the machine learning model;
   producing, by the one or more processors and based on the forecast and the machine learning model for assessing the workflow, a recommended alteration to the workflow for one or more remaining sets of the plurality of iterations of the workflow, wherein the recommended alteration to the workflow comprises a percentage of the one or more tasks of the workflow to automate;
   receiving, by the one or more processors after producing the recommended alteration to the workflow, new workflow results from completion of a second set of the plurality of iterations of the workflow; and
   calibrating, by the one or more processors, the machine learning model for assessing the workflow structure using features extracted from training data extracted from the new workflow results.

2. The method of claim 1, wherein the forecast indicates that altering the workflow structure in a specified fashion will result in benefits comprising an increase in efficiency, an increase in a level of quality of the workflow results, or a decrease in a cost associated with the workflow.

3. The method of claim 2, further comprising:
   altering the workflow in accordance with the recommendation;
   testing the altered workflow to obtain new workflow results; and
   validating the new workflow results to determine whether the benefits were achieved.

4. The method of claim 1, wherein the recommendation comprises identifying at least one task in the workflow structure to be split into one or more sub-tasks.

5. The method of claim 4, wherein the recommendation comprises specifying task completion quality requirements for at least one of the sub-tasks that differ from original task completion quality requirements specified for the identified task.

6. The method of claim 1, wherein the recommendation comprises selecting at least one task in the workflow structure to be automated.

7. The method of claim 6, wherein the task is selected to be automated based on an attribute of the task that suggests that the task is a good candidate for automation.

8. The method of claim 7, wherein the attribute comprises:
   a number of iterations in the first set of iterations;
   a number of iterations in a second set of iterations; or
   a type of the task.

9. The method of claim 6, wherein the recommendation comprises presenting a forecasted accuracy for at least one portion of the workflow structure that is automated.

10. The method of claim 1, wherein the recommendation comprises adding a new task to the workflow structure.

11. The method of claim 1, further comprising:
receiving a minimum acceptable accuracy level; and
providing a workflow alteration strategy for each of the tasks in the workflow structure to achieve the acceptable accuracy level.

12. The method of claim 1, wherein the adjudication rule provides a degree of confidence in the correctness or accuracy of a workflow result.

13. One or more computer-readable non-transitory storage media embodying software comprising instructions operable when executed to:
receive results from completion of a first set of a plurality of iterations of a workflow, each iteration of the workflow comprising one or more tasks performed by one or more distributed computing systems;
extract, from the workflow results, training data for training a machine learning model to assess the workflow structure, wherein the workflow structure comprises the specification of tasks within each iteration of the workflow, wherein extracting the training data comprises extracting features from workflow results that satisfy an adjudication rule and that are appropriate for use by the machine learning model;
train the machine learning model for assessing the workflow structure using the features of the training data extracted from the workflow results;
determine, using the trained machine learning model for assessing the workflow structure, a forecast of an effect on one or more metrics of altering the workflow structure in accordance with one or more alterations proposed based on the machine learning model;
produce, based on the forecast and the machine learning model for assessing the workflow, a recommended alteration to the workflow for one or more remaining sets of the plurality of iterations of the workflow, wherein the recommended alteration to the workflow comprises a percentage of the one or more tasks of the workflow to automate;
receive, after producing the recommended alteration to the workflow, new workflow results from completion of a second set of the plurality of iterations of the workflow; and
calibrate the machine learning model for assessing the workflow structure using features extracted from training data extracted from the new workflow results.

14. The media of claim 13, wherein the forecast indicates that altering the workflow structure in a specified fashion will result in benefits comprising an increase in efficiency, an increase in a level of quality of the workflow results, or a decrease in a cost associated with the workflow.

15. The media of claim 14, the software further comprising instructions operable when executed to:
alter the workflow in accordance with the recommendation;
test the altered workflow to obtain new workflow results; and
validate the new workflow results to determine whether the benefits were achieved.

16. A system comprising one or more processors and a memory coupled to the processors comprising instructions executable by the processors, the processors being operable when executing the instructions to:
receive results from completion of a first set of a plurality of iterations of a workflow, each iteration of the workflow comprising one or more tasks performed by one or more distributed computing systems;
extract, from the workflow results, training data for training a machine learning model to assess the workflow structure, wherein the workflow structure comprises the specification of tasks within each iteration of the workflow, wherein extracting the training data comprises extracting features from workflow results that satisfy an adjudication rule and that are appropriate for use by the machine learning model;
train the machine learning model for assessing the workflow structure using the features of the training data extracted from the workflow results;
determine, using the trained machine learning model for assessing the workflow structure, a forecast of an effect on one or more metrics of altering the workflow structure in accordance with one or more alterations proposed based on the machine learning model;
produce, based on the forecast and the machine learning model for assessing the workflow, a recommended alteration to the workflow for one or more remaining sets of the plurality of iterations of the workflow, wherein the recommended alteration to the workflow comprises a percentage of the one or more tasks of the workflow to automate;
receive, after producing the recommended alteration to the workflow, new workflow results from completion of a second set of the plurality of iterations of the workflow; and
calibrate the machine learning model for assessing the workflow structure using features extracted from training data extracted from the new workflow results.

17. The system of claim 16, wherein the forecast indicates that altering the workflow structure in a specified fashion will result in benefits comprising an increase in efficiency, an increase in a level of quality of the workflow results, or a decrease in a cost associated with the workflow.

18. The system of claim 17, the processors being further operable when executing the instructions to:
alter the workflow in accordance with the recommendation;
test the altered workflow to obtain new workflow results; and
validate the new workflow results to determine whether the benefits were achieved.

* * * * *